United States Patent [19]
Kohler et al.

[11] Patent Number: 5,576,390
[45] Date of Patent: Nov. 19, 1996

[54] POLYISOBUTYLENES HAVING ASPARTIC ACID ESTER TERMINAL GROUPS

[75] Inventors: Burkhard Köhler; Wolfgang Ebert, both of Krefeld; Klaus Horn, Dormagen; Richard Weider, Leverkusen; Thomas Scholl, Bergisch Gladbach, all of Germany

[73] Assignee: Bayer AG, Leverkusen, Germany

[21] Appl. No.: 488,654

[22] Filed: Jun. 8, 1995

[30] Foreign Application Priority Data

Jun. 20, 1994 [DE] Germany .................... 44 21 556.8

[51] Int. Cl.$^6$ .................................................. C08F 8/32
[52] U.S. Cl. .................... 525/146; 525/152; 525/285; 525/333.7; 525/379
[58] Field of Search .................................. 525/146, 152, 525/333.7, 285

[56] References Cited

U.S. PATENT DOCUMENTS

| | | | |
|---|---|---|---|
| 4,316,973 | 2/1982 | Kennedy | 525/333.7 |
| 4,908,421 | 3/1990 | Mishra et al. | 525/333.7 |
| 4,994,526 | 2/1991 | Peters | 525/146 |
| 5,242,983 | 9/1993 | Kennedy et al. | 525/333.7 |
| 5,247,021 | 9/1993 | Fujisawa et al. | 525/333.7 |
| 5,294,675 | 3/1994 | Forster et al. | 525/333.7 |
| 5,442,015 | 8/1995 | Kennedy et al. | 525/333.7 |

*Primary Examiner*—Bernard Lipman
*Attorney, Agent, or Firm*—Connolly & Hutz

[57] ABSTRACT

The present invention provides telechelic polyisobutylenes having aspartic acid ester terminal groups, the production thereof and the use thereof as modifiers preferably for thermoplastic aromatic polycarbonates, and the mixing thereof with reaction-less polyisobutylenes.

5 Claims, No Drawings

POLYISOBUTYLENES HAVING ASPARTIC ACID ESTER TERMINAL GROUPS

The present invention relates to polyisobutylenes having aspartic acid ester terminal groups and to a process for the production thereof. The polyisobutylenes according to the invention are tetrafunctional in respect of ester groups, bifunctional in respect of secondary amino groups and likewise bifunctional in respect of tertiary N-alkylamino groups.

Aspartic acid ester terminal groups include N-alkylaspartic acid ester terminal groups.

The functional polyisobutylenes according to the invention are highly suitable, for example, as building blocks for block polycondensates. Such functional polymers are also known as telechelic polymers (for a definition of "telechelic polymers", see Römpp Chemie Lexikon, 9th edition, vol. 6, p. 4,485).

Polyolefines having functional terminal groups are known.

Thus DE-AS 1 162 559, for example, discloses polyolefines having hydroxyl groups in the terminal position.

DE-OS 3 618 378 (Le A 24 330) discloses polyolefine carboxylic acids.

EP-OS 0 305 718 discloses polyisobutylenes which terminate with carboxylic acid, carboxylic acid halide or carboxylic acid ester groups. These polyisobutylenes are also designated telechelic polymers.

DE-OS 4 122 655 (Le A 28 403) and U.S. Pat. No. 5,274,182 also disclose terminally functionalised isobutylene polymers containing 1.8 to 2.5 mole of reactive groups per mole polymer (page 3, line 4 of DE-OS). —NH$_2$ or primary amino groups, inter alia, serve as functional groups.

The object was now to provide isobutylene polymers having three or more reactive terminal groups, in order to be able to obtain therefrom block polycondensates having a branched structure.

The present invention now provides a process for the production of polyisobutylenes having aspartic acid ester terminal groups or having N-alkylaspartic acid ester terminal groups, which is characterised in that α,ω-diaminopolyisobutylenes or α,ω-di-(alklylamino)polyisobutylenes are reacted with ethylene-α,β-dicarboxylic acid dialkylesters, in which the double bond may be present in the cis or trans configuration, in molar ratios of polyisobutylene to ethylene dicarboxylic acid dialkylester of between 1:2 and 1:30, at temperatures of from 30° C. to 140° C. with or without solvent.

The present invention also provides polyisobutylenes having aspartic acid ester terminal groups or having N-alkyl aspartic acid ester terminal groups.

The α,ω-diaminopolyisobutylenes or α,ω-di-(alklylamino)polyisobutylenes have number average molecular weights of from 800 to 12,000, preferably from 1,200 to 7,000, and are known from the literature or may be prepared by processes which are known from the literature (see DE-OS 4 122 655 and U.S. Pat No. 5,274,182).

Preferred α,ω-diaminopolyisobutylenes or α,ω-di(alkylamino)polyisobutylenes are those of the formula (I)

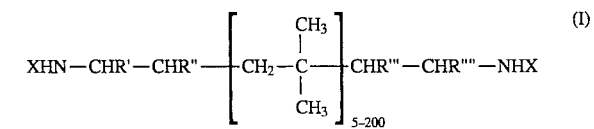

in which R', R", R'" and R"" stand for hydrogen or a $C_1$-$C_3$ alkyl group, and at least two of the latter radicals R' to R"" denote hydrogen and in which X is H or $C_1$-$C_{16}$ alkyl.

Examples of suitable α,ω-diaminopolyisobutylenes or α,ω-di(alkylamino)polyisobutylenes are the products prepared and described in Examples 2, 4 and 5 of DE-OS 4 122 655 and U.S. Pat. No. 5,274,182.

Ethylene-α,β-dicarboxylic acid dialkylesters which are the second reactant in the process according to the invention are also known from the literature, namely as fumaric acid esters and maleic acid esters, wherein the alkylester radicals may be $C_1$-$C_{22}$-alkyl radicals. The ethylene dicarboxylic acid dialkylesters consequently correspond preferably to the formula (II)

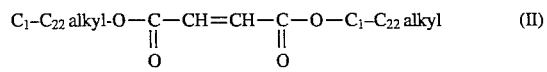

The process according to the invention corresponds to that of a Michael addition and is consequently also known as to its reaction conditions.

Suitable solvents are aliphatic or aromatic hydrocarbons such as, for example, toluene, xylene, mesitylene, octane, decane, cyclohexane, or halogenated hydrocarbons such as, for example, chlorobenzene, o-dichlorobenzene, o-chlorotoluene.

The polyisobutylenes having aspartic acid ester terminal groups or having N-alkylaspartic acid ester terminal groups, which are obtainable according to the invention, are isolated by distilling off the solvent and/or the excess ethylene-α,β-dicarboxylic acid dialkylester.

Polyisobutylenes which are preferably obtainable according to the invention are those of the formula (III)

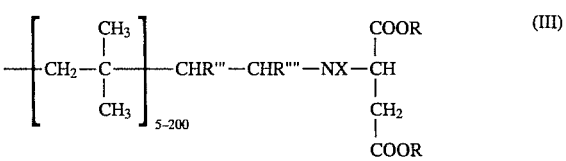

in which R', R", R'" and R"" are H or $C_1$-$C_3$ alkyl, with at least two of the latter radicals R' to R"" denoting H, in which X is H or $C_1$-$C_{16}$ alkyl and in which R is $C_1$-$C_{22}$ alkyl.

The polyisobutylenes according to the invention, as already intimated, are suitable as building blocks or as modifiers for interesterifiable or interamidable polycondensates, preferably as modifiers for thermoplastic aromatic polycarbonates. The thermoplastic aromatic polycarbonates may be modified in the melt in extruders or kneaders at temperatures of between 110° C. and 320° C. and optionally with use of catalysts such as, for example, DABCO, tetramethylguanidine, diazabicycloundecene and diazabicyclononene.

The present invention consequently also provides the use of the polyisobutylenes having aspartic acid ester terminal groups or having N-alkylaspartic acid ester terminal groups according to the invention for the modification of thermoplastic aromatic polycarbonates.

The latter modified, thermoplastic aromatic polycarbonates in this case prove lighter in colour than comparable products modified with polyisobutylenes bearing methylamino terminal groups according to DE-OS 4 122 655 and U.S. Pat. No. 5,274,182. This effect was unforeseeable.

The thermoplastic aromatic polycarbonates modified according to the invention may be isolated and granulated in conventional manner.

The thermoplastic aromatic polycarbonates modified according to the invention may be processed on conventional equipment to form any moulded bodies such as components for automobile manufacture, for example bodywork components or bumpers, or protective helmets or household articles, for example vacuum cleaner housings and the like, or equipment pieces, for example sink units, and the like.

The latter moulded bodies consequently show industrial applicability, for example anywhere where high resistance to hydrocarbons is required.

The aromatic polycarbonates modified according to the invention may still be mixed with non-reacting polyisobutylenes.

The present invention consequently also provides mixtures of
  A) from 75 to 99 wt-%, preferably from 85 to 97 wt-% of the thermoplastic aromatic polycarbonates modified according to the invention and
  B) from 1 to 25 wt-% preferably from 3 to 15 wt-% of non-reacting polyisobutylenes.

Non-reacting polyisobutylenes according to component B) of the mixtures according to the invention are cationic polymers of olefines and optionally dienes containing at least 85% isobutylene. Polyisobutylenes are described on page 3539, vol. 5, of Römpp Chemie Lexikon, 9th edition, 1992, Georg Thieme Verlag under the key word "polyisobutylenes". The molar mass of the to be used according to the invention is from 10,000 to 1,200,000 g/mol. This is determined by light scattering.

Examples of dienes which are suitable as comonomers for isobutylene are butadiene, isoprene, 2-chlorobutadiene(1,4), 2-bromobutadiene-(1,3), pentadiene, hexadiene, 2-ethylbutadiene-(1,3), 2-propylbutadiene-(1,3), 2-phenylbutadiene-(1,3), 2-methylpentadiene-(1,3) and 3-propylhexadiene. Other suitable olefinic comonomers are styrene, α-methylstyrene, m/p-methylstyrene or divinylbenzene.

The mixtures according to the invention are prepared in known manner in the melt at temperatures of between 200° C. and 320° C. in extruders or kneaders or by mixing and common evaporation of the solutions of the components in evaporation extruders at from 150° C. to 320° C. The mixtures may then be isolated and granulated in known manner.

The mixtures according to the invention are processed to form moulded bodies, and such moulded bodies utilised industrially, substantially as indicated hereinabove in respect of the thermoplastic aromatic polycarbonates modified according to the invention.

EXAMPLES

Example 1

The mixture of 50 ml maleic acid diethylester and 118 g of a α,ω-diaminopolyisobutylene, of molar mass 3,500 g/mol, prepared according to Example 2 of DE-OS 4 122 655 or according to Example 2 of U.S. Pat. No. 5,274,182, is allowed to stand overnight at 20° C. and is then heated to 100° C. for one hour. The excess maleic acid diethylester is then distilled off in vacuo (20 hPa). A quantitative yield of polyisobutylene having aspartic acid diethylester terminal groups is obtained.

Example 2

(example of use)

100 g of the polyisobutylene having aspartic acid diethylester terminal groups from Example 1 is dissolved in 900 g chlorobenzene, and 1,900 g homopolycarbonate obtained from 2,2-bis(4-hydroxyphenyl) propane having an $\eta_{rel}$ (measured in $CH_2Cl_2$ at 25° C. and at a concentration of 0.5 g in 100 ml $CH_2Cl_2$) of 1.28 is dissolved in a mixture of 3 l chlorobenzene and 8 l methylene chloride, the solutions are mixed and are evaporated at 280° C. in the evaporation extruder (ZSK 32 with vacuum dome). The modified polycarbonate obtained has the following characteristics: tough-brittle transition of fracture in impact strength test, notched, around −20° C. An 80×10×4 mm bar is tensioned to an outer fibre strain of 0.6% and exposed for 2 minutes to a 1:1 isooctane/toluene mixture. The sample shows no cracking (unmodified PC fractures under these conditions). The colour of the compound is light yellow.

Example 3

(example of use, comparative) (=sample embodiment from German Patent Application P 44420656.9 (Le A 30 377)

100 g of a substantially bifunctional methylamino-terminated telechelic polyisobutylene having an NH value of 29, obtainable according to Example 5 of DE-OS 4 122 655 and U.S. Pat. No. 5,274,182, is dissolved in 900 g chlorobenzene, and 1,900 g homopolycarbonate from Example 2 hereinabove is dissolved in a mixture of 3 l chlorobenzene and 8 l $CH_2Cl_2$, the solutions are mixed and are evaporated in accordance with Example 2 hereinabove. The modified polycarbonate obtained has the following characteristics: tough-brittle transition of fracture in impact strength test, notched, around −20° C. An 80×10×4 mm bar is tensioned to an outer fibre strain of 0.6% and exposed for 2 minutes to a 1:1 isooctane/toluene mixture. The sample shows no cracking. The colour of the compound is light brown to brown.

We claim:

1. Polyisobutylenes having aspartic acid ester terminal groups or having N-alkyl-aspartic-acid ester terminal groups.

2. A method of using the polyisobutylenes of claim 1, wherein said polyisobutylenes are added to thermoplastic aromatic polycarbonates to modify said thermoplastic aromatic polycarbonates.

3. Mixtures of
  A) from 75 to 99 wt-% of thermoplastic aromatic polycarbonates that have been modified with the polyisobutylenes of claim 1, and
  B) from 1 to 25 wt-% non-reacting polyisobutylenes.

4. Mixtures according to claim 3, wherein said mixture contains from 85 to 97 wt-% of said modified thermoplastic aromatic polycarbonates.

5. Mixtures according to claim 3, wherein said mixture contains from 3 to 15 wt-% of said non-reacting polyisobutylenes.

* * * * *